(12) United States Patent  (10) Patent No.: US 8,543,725 B1
Nemavat et al.  (45) Date of Patent: Sep. 24, 2013

(54) FILTERING SUPERFLUOUS DATA FRAGMENTS ON A COMPUTER NETWORK

(75) Inventors: Pradeep Jugraj Nemavat, Pune (IN); Sandesh Goel, Pune (IN)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/567,874

(22) Filed: Aug. 6, 2012

Related U.S. Application Data

(62) Division of application No. 12/547,301, filed on Aug. 25, 2009, now Pat. No. 8,239,567.

(60) Provisional application No. 61/095,461, filed on Sep. 9, 2008.

(51) Int. Cl.
*G06F 15/16* (2006.01)
(52) U.S. Cl.
USPC ............ 709/235; 709/232; 370/229; 370/235
(58) Field of Classification Search
USPC ................. 709/232–235; 370/229–230, 235, 370/237
See application file for complete search history.

(56) References Cited

U.S. PATENT DOCUMENTS

| | | | |
|---|---|---|---|
| 6,480,471 B1 | 11/2002 | VanZante et al. | |
| 6,781,992 B1 | 8/2004 | Rana et al. | |
| 6,912,217 B1 | 6/2005 | Vogel | |
| 7,349,437 B2 | 3/2008 | Horton et al. | |
| 7,420,921 B2 * | 9/2008 | Fischer | 370/235 |
| 7,486,673 B2 | 2/2009 | Harijono et al. | |
| 7,583,673 B2 | 9/2009 | Liu | |
| 7,685,121 B2 | 3/2010 | Brown et al. | |
| 7,697,519 B2 | 4/2010 | Arndt | |
| 7,746,797 B2 | 6/2010 | El-Hennawey et al. | |
| 7,747,256 B2 | 6/2010 | Hanov et al. | |
| 7,768,950 B2 * | 8/2010 | Kim et al. | 370/310 |
| 7,831,827 B2 | 11/2010 | Walmsley | |
| 7,855,999 B2 * | 12/2010 | Lindskog et al. | 370/338 |
| 7,921,103 B2 * | 4/2011 | Olston et al. | 707/717 |
| 7,936,678 B2 | 5/2011 | Paloheimo et al. | |
| 8,024,724 B2 * | 9/2011 | Garrison Stuber et al. | 717/172 |
| 8,239,567 B1 * | 8/2012 | Nemavat et al. | 709/235 |
| 8,411,561 B2 * | 4/2013 | Schliwa-Bertling et al. | 370/229 |
| 2002/0147819 A1 * | 10/2002 | Miyakoshi et al. | 709/228 |
| 2003/0081624 A1 | 5/2003 | Aggarwal et al. | |
| 2006/0187834 A1 | 8/2006 | Nichols et al. | |
| 2008/0304485 A1 | 12/2008 | Sinha et al. | |
| 2009/0185560 A1 * | 7/2009 | Venkatesan et al. | 370/389 |
| 2009/0316698 A1 * | 12/2009 | Menten | 370/392 |

OTHER PUBLICATIONS

A. Tanenbaum, *Computer Networks*, Fourth Ed., Prentice Hall PTR, Upper Saddle River, NJ (2003), pp. 426-431.

* cited by examiner

*Primary Examiner* — Bharat N Barot

(57) ABSTRACT

In a method of controlling transmission of data units, a first fragment of a data unit is received, and it is determined whether other fragments of the data unit have been received. The first fragment of the data unit is transmitted only if the other fragments of the data unit have been received.

17 Claims, 5 Drawing Sheets

FILTERING SUPERFLUOUS DATA FRAGMENTS ON A COMPUTER NETWORK

CROSS-REFERENCE TO RELATED APPLICATION

This application is a divisional of U.S. patent application Ser. No. 12/547,301 filed Aug. 25, 2009, now U.S. Pat. No. 8,239,567, entitled "Filtering Superfluous Data Fragments on a Computer Network," and claims the benefit of U.S. Provisional Patent Application No. 61/095,461, entitled "IP Reassembly Problem in Network Without Flow Control," which was filed on Sep. 9, 2008, the entire disclosure of which is hereby incorporated by reference herein.

FIELD OF THE DISCLOSURE

The present disclosure relates generally to communication networks and, more particularly, to filtering superfluous data fragments on a computer network.

BACKGROUND

In communication networks, data units (e.g., IP packets) may be fragmented for various reasons. When fragmented data units are received, it may be necessary to efficiently reassemble the fragmented packets.

One problem associated with fragmentation is that loss of fragments can lead to inefficient use of resources. In particular, if a fragment of a data unit is lost during transmission across a computer network, different devices in the computer network may continue processing and forwarding other fragments of the transmitted data unit, even though such fragments are rendered superfluous (i.e., they will ultimately be dropped, e.g., by the target host, because they will not be able to reconstruct a complete data unit). As a result, target hosts and devices on the network may waste potentially valuable resources (e.g., computational resources, storage resources, and so on) processing superfluous fragments. Moreover, these superfluous fragments may needlessly consume bandwidth and contribute to network delay and congestion and potentially prevent important data from being received in a timely manner.

SUMMARY OF THE DISCLOSURE

In an embodiment, a method of controlling transmission of data units includes receiving a fragment of a data unit. The method further includes determining whether other fragments of the data unit have been received. The method further includes transmitting the fragment of the data unit only if other fragments of the data unit have been received.

In another embodiment, an apparatus comprises a memory, at least one ingress interface to receive data units, and at least one egress interface to transmit data units. The apparatus also comprises a forwarding engine to forward data units received via the at least one ingress interface to the at least one egress interface. The forwarding engine includes a fragment filtering engine configured to determine, in response to receiving one fragment of a data unit that was previously fragmented into an ordered sequence of fragments, whether a predefined percentage of all fragments in the ordered sequence of fragments have been received as of the time when the one fragment is received, and when it is determined that the predefined percentage of all fragments in the ordered sequence of fragments have been received as of the time when the one fragment is received, transmit the one fragment. The fragment filtering engine is also configured to, when it is determined that the predefined percentage of all fragments in the ordered sequence of fragments has not been received as of the time when the one fragment is received, (i) store the one fragment in the memory for possible future transmission, or (ii) drop the one fragment.

Like reference numbers and designations in the various drawings indicate like elements. Furthermore, when individual elements are designated by references numbers in the form Nn, these elements may be referred to in the collective by N. For example, FIG. 1 includes hosts 105a-c that may be referred to collectively as hosts 105.

DETAILED DESCRIPTION

Figure 1:
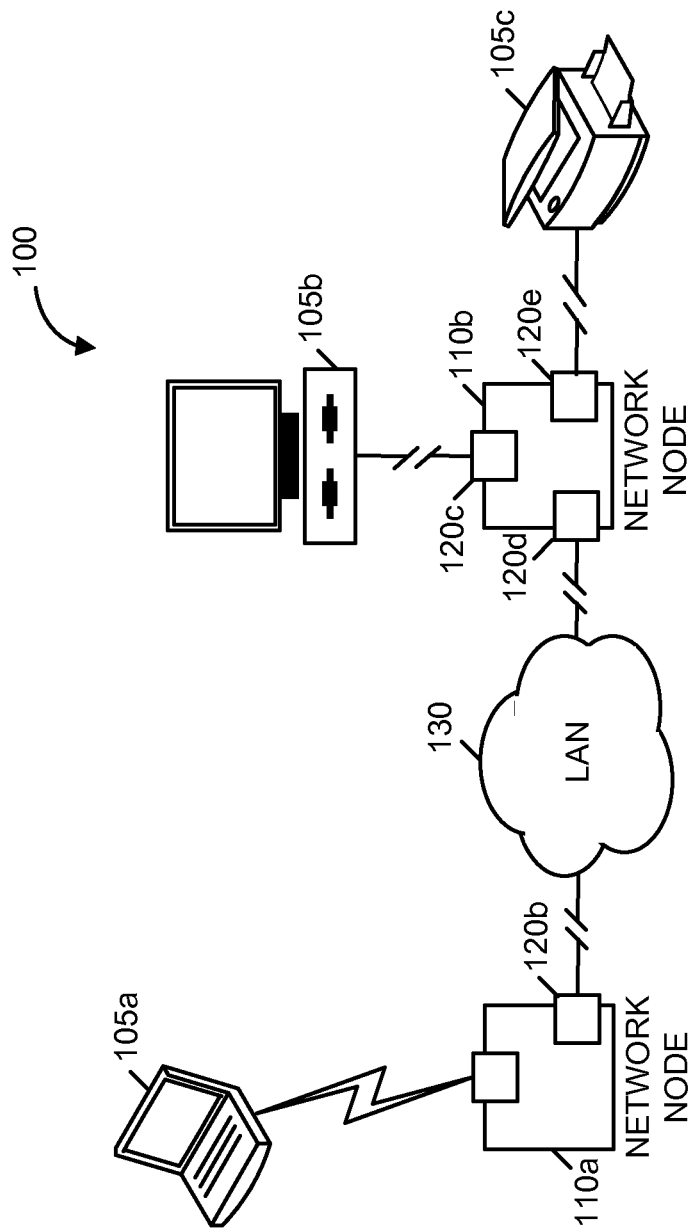
FIG. 1 is a block diagram of an example computer network.

FIG. 1 is a block diagram of an example computer network 100. The computer network 100 may include a number of hosts 105 coupled via a number of network nodes 110. Hosts 105 may be coupled to network nodes 110 via various kinds of network interfaces 120 (e.g., an Ethernet interface, a wireless interface, and so on). A given host 105 may be coupled to a network interface 120 via a direct communication link. A given host 105 may also be coupled to a network interface 120 via other network nodes 110 or systems, other networks (e.g., local area networks 130), etc.

The hosts 105 may be a variety of devices and/or systems, including personal computers, laptops, printers, copier systems, scanners, personal digital assistants (PDAs), wireless devices, fax machines, and so on. A given host 105 may act as a source host that transmits a communication and/or as a target host that receives the communication. The hosts 105 generally communicate via the computer network 100 by sending and receiving data in data units, e.g., packets, frames, datagrams, cells, and so on. The hosts 105 may communicate wirelessly (e.g., using radio signals), via wired links, or both.

The network nodes 110 generally facilitate communication between the hosts 105, as well as between other devices, systems, network segments, subnets, and so on. Network nodes 110 may be located at the edge of the computer network 100, or they may be part of a network backbone interconnecting different networks and nodes. It will be appreciated that the network nodes 110 described herein are not limited to any particular protocol layer or to a particular networking technology. Moreover, the network nodes 110 may operate simultaneously at multiple protocol layers, and may couple together networks of different types, including Ethernet, Fiber Channel, Asynchronous Transfer Mode (ATM) networks, wireless local area networks, and so on. Examples of network nodes 110 include hubs, repeaters, bridges, routers, firewalls, modems, wireless access points, and so on.

In some instances, in order to manage network traffic, the computer network 100, or portions of the computer network 100, may impose a maximum size for a data unit that the computer network 100, or a portion thereof, will support. This imposed maximum data unit size is commonly referred to as the Maximum Transmission Unit (MTU). The MTU may be based on a number of factors, including hardware capabilities of devices on the computer network 100, requirements of particular protocols and/or standards, Quality of Service (QoS) constraints, and so on. For example, a given network may impose an MTU to prevent large data units from monopolizing a transmission medium for a significant period of time and thus delaying transmission of other data units. An MTU may be fixed by a standard (e.g., Ethernet) or decided at connect time, for example.

In some embodiments, when a particular data unit exceeds the size of an MTU of the computer network, or portions thereof, the data unit may be fragmented into two or more fragments, where none of the fragments exceed the MTU, and the different fragments may be then treated as individual data units. For example, when a relatively large data unit arrives at an interface to a network with an MTU lower than the size of the data unit, the relatively large data unit may be divided into smaller fragments, and the individual fragments may pass through the interface as separate data units. As a result, in some instances, a flow of data through a given interface may include a mix of fragments of different data units. Consequently, different data units may efficiently share the interface. Larger individual packets can be prevented from blocking the interface for a long period of time, and overall latency may generally be reduced.

A particular data unit may exceed the size of an MTU of the computer network 100, or portions thereof (and thus require fragmentation), for a number of reasons. For example, a source host 105 may transmit data units of size specified by a certain protocol, and that protocol may specify relatively large data units (as compared to the capacities of the computer network 100 or portions thereof). Also, different protocols, such as tunneling protocols, may attach additional headers (e.g., tunnel headers) to data units, causing these data units to exceed an MTU of a network, even if the data unit would not exceed the MTU in the absence of the attached header.

Fragmentation of data units may be performed at various points in the computer network 100 and/or by various devices and systems. For example, fragmentation may be performed by a network node 110 when the network node 110 receives a relatively large data unit and determines that the received data unit needs to be forwarded over a network with a relatively small MTU (e.g., an MTU that is smaller than the size of the received data unit). Alternatively, or in addition, a source host 105 that initially transmits a data unit (and chooses the size of the data in accordance with a particular protocol) may fragment the data unit if, for example, the source host 105 is coupled to a subnet with an MTU that is smaller than the size of the data unit.

Furthermore, fragmentation of data units may be performed at multiple points in the computer network 100 and/or by multiple devices and systems. For example, a source host 105 that initially transmits a data unit over a subnet that has an MTU smaller than the size of the transmitted data unit may break the data unit into fragments that do not exceed the MTU of the subnet and then transmit the individual fragments separately. As the fragments travel across the computer network 100, the fragments themselves may be further fragmented into smaller fragments. For example, if a network node 110 receives a fragment, and the network node 110 determines that the received fragment needs to be forwarded over a subnet with an MTU that is smaller than the size of the fragment, the network node 110 may further break the fragment into smaller fragments.

Fragments that travel across the computer network 100 may be reassembled, e.g., back to the original data unit, at various points in the computer network 100 and/or by various network devices and systems. For example, fragments may be reassembled at their final destination (e.g., by a target host 105). Alternatively, or in addition, fragments may be reassembled at various, and by multiple, intermediate devices (e.g., network nodes 110) and/or systems.

In some implementations, when data units are fragmented, data specific to fragmentation may be added to the resulting fragments (e.g., to the headers of the resulting fragments) to enable later reassembly. For example, the header of a fragment may include data that identifies the source host 105 of the data unit. The header of a fragment may further include data that identifies the original data unit associated with the fragment. In some embodiments, one or more combinations of fields of a fragment header may be combined or otherwise used to form a unique identifier of the original data unit associated with the fragment.

The header of a fragment may also include data that identifies which portion of the data from the original data unit is carried in the fragment. In some embodiments, for example, a fragment of a given data unit may carry in its header the position (e.g., in bytes) of the fragment in the data field of the original data unit (sometimes referred to as "offset"). Additional information that may be carried in the header of a fragment may include the total number of fragments associated with the data unit, the size of the fragment, some sort of an indicator (e.g., a Boolean field) that the fragment is, in fact, a fragment of a larger data unit, and so on. Some or all of the information inside the headers of fragments may be used by devices (e.g., network nodes 110) and systems to reassemble the fragments, e.g., into a larger fragment or the original data unit.

One problem that may be associated with fragmentation of data units is that loss of fragments can lead to inefficient use of resources. In particular, if a fragment of a data unit transmitted from a source host to a destination host is lost during transmission across the computer network 100, different devices in the computer network 100 (and the destination host) may continue processing and forwarding other fragments of the transmitted data unit, even if the data unit will ultimately be dropped by the target host because of the lost fragment. As a result, the target host and devices in the computer network 100 may waste potentially valuable resources (e.g., computational resources, storage resources, and so on) processing superfluous fragments. Moreover, these superfluous fragments may needlessly consume bandwidth and contribute to network delay and congestion and potentially prevent important data from being received in a timely manner.

Loss of fragments (and data units in general) may be caused by a number of factors, including signal degradation over the network medium, oversaturated network links, corrupted packets rejected in-transit, faulty networking hardware, maligned system drivers or network applications, and so on. Another cause of fragment loss is incapacity of a network node 110 to process and/or forward fragments at the same rate as the network node 110 receives those fragments. For example, if a network node 110 receives fragments via a wired local area network (e.g., Ethernet) interface 120 and forwards these fragments via a wireless interface 120, the network node 110 may be receiving fragments at a faster rate than the network node 100 may be able to forward them. As a result, the network node 110 may drop some of the received fragments.

In order to use network resources more efficiently, a network node 110 may implement a fragment-filtering scheme to minimize the transmission of superfluous fragments. The fragment-filtering scheme may be implemented in a number of ways. Details of several example implementations are described below.

Figure 2:
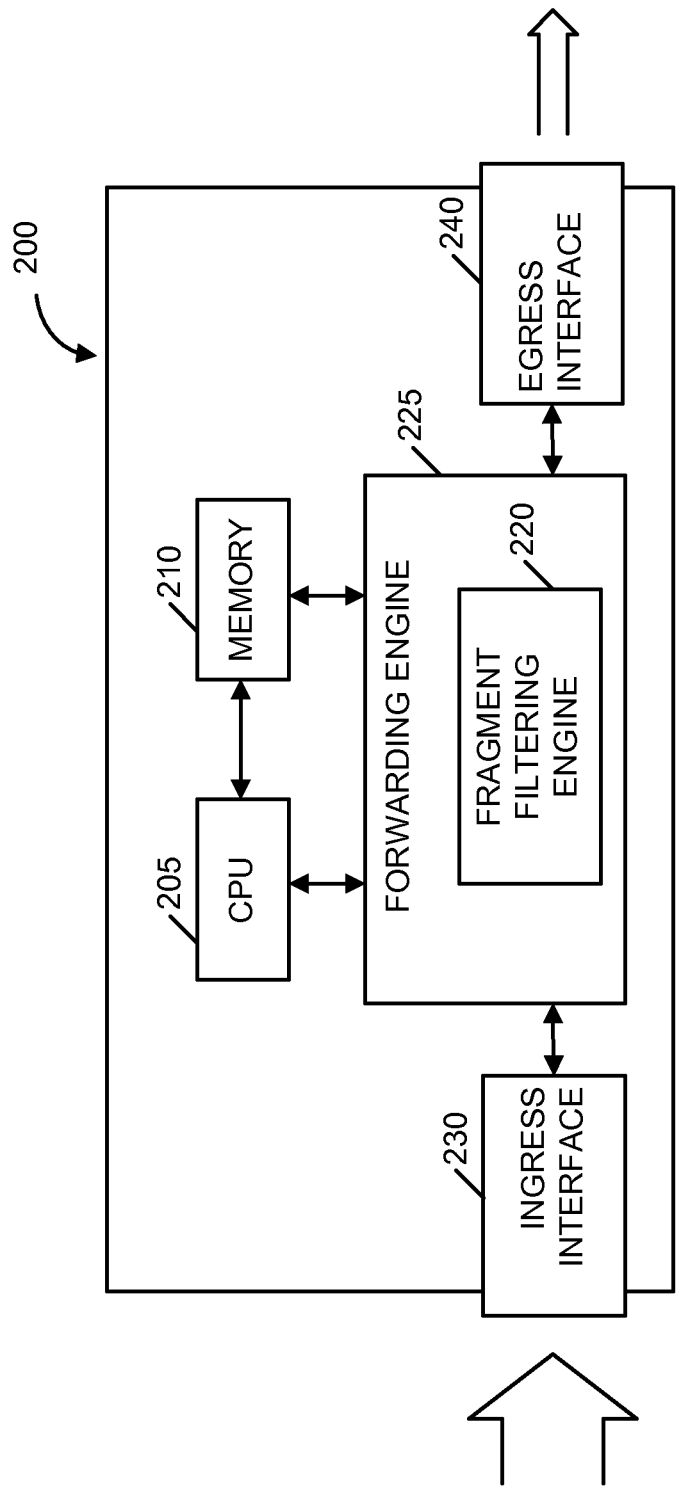
FIG. 2 is a simplified block diagram of an example network node that is adapted to filter superfluous data fragments.

FIG. 2 is a simplified block diagram of an example network node 200 that is adapted to filter superfluous fragments and to minimize the transmission of such fragments. The network node 200 may be utilized in the computer network 100 as one or more of the network nodes 110, for example. It will be understood, however, that the computer network 100 may alternatively use one or more other network nodes different than the network node 200 and configured to filter superfluous fragments. In general, the computer network 100 may include many different types of network nodes 110, one or more of which may be configured to filter superfluous fragments.

The network node 200 includes one or more ingress interfaces 230 and one or more egress interfaces 240. The ingress interfaces 230 are generally for receiving data units, and the egress interfaces 240 are generally for transmitting data units. The ingress interfaces 230 and the egress interfaces 240 are coupled together via a forwarding engine 225, which generally transfers data units from the ingress interfaces 230 to appropriate egress interfaces 240, and which may perform additional data processing functions. The network node 200 also may include a central processing unit (CPU) 205 coupled to the forwarding engine 225. The CPU 205 may execute computer readable instructions stored in a memory 210 coupled to the CPU 205.

The forwarding engine 225 generally performs wire speed functions associated with transferring data units from ingress interfaces 230 to egress interfaces 240, whereas the CPU 205 generally performs functions that can tolerate higher latency. The memory 210 also may be coupled to the forwarding engine 225. The forwarding engine 225 may be implemented in hardware, e.g., on a single application specific integrated circuit (ASIC) coupled to the CPU 205. In other embodiments, other types of integrated circuits may be used such as a field programmable gate array (FPGA), a programmable logic array (PLA), a custom integrated circuit, etc. In other embodiments, the forwarding engine 225 may be implemented on multiple different integrated circuits that are coupled together.

The forwarding engine 225 includes a fragment filtering engine 220 generally configured to filter superfluous fragments and to minimize transmission of such fragments. Generally speaking, the fragment filtering engine 220 monitors incoming data fragments and drops data fragments if other data fragments associated with the same data unit have been dropped, or are likely to be dropped in the future. Operations of the fragment filtering engine 220 will subsequently be described in more detail.

Figure 3:
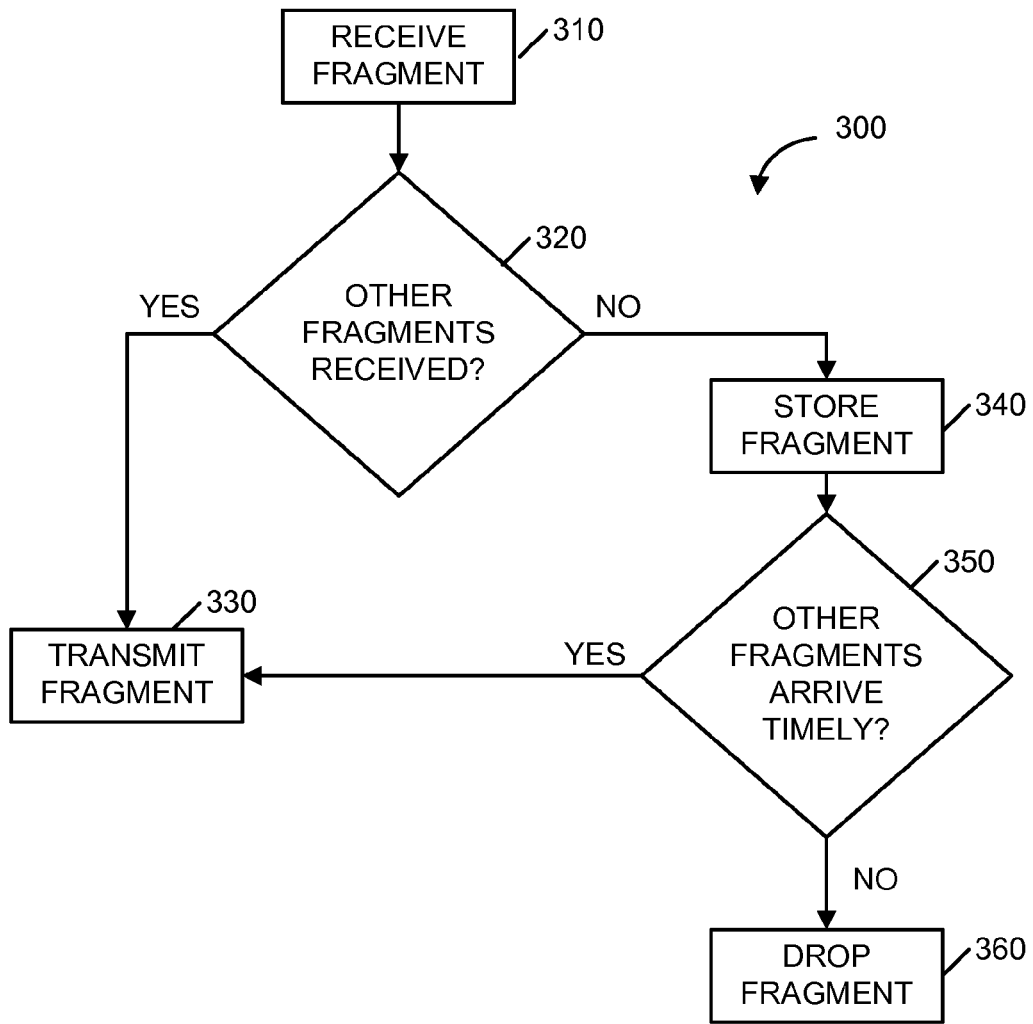
FIG. 3 is a flow diagram of an example method of filtering superfluous data fragments.

FIG. 3 is a flow diagram illustrating an example method 300 that may be implemented by the filtering engine 220 to filter superfluous data fragments. For ease of explanation, FIG. 3 will be described with reference to FIGS. 1-2. It will be understood, however, that the method 300 may be utilized with systems and devices other than those illustrated in FIGS. 1-2.

Generally speaking, a filtering engine 220 operating in accordance with the method 300 in FIG. 3 may accumulate a certain number of the data fragments associated with a given data unit (e.g., a predetermined percentage) before forwarding any of the fragments associated with that data unit. More specifically, when the network node 200 receives a fragment of a data unit (block 310), the filtering engine 220 may determine whether a certain predetermined percentage (e.g., 90%) of other fragments of that data unit has been received (block 320) and only forward the new fragment (block 330) if that percentage of other fragments has been received (YES branch of block 320). In some embodiments, in order to significantly minimize the transmission of superfluous fragments, or to prevent any such transmission, the filtering engine 220 may forward newly received fragments only if, or when, all of the other fragments associated the same data unit (i.e., 100%) have been received.

If the network node 200 receives a fragment of a data unit (block 310), and the predetermined percentage (e.g., 90%) of other fragments of that data unit has not been received (NO branch of block 320), the filtering engine 220 may store the received fragment (e.g., in memory 210) and delay the forwarding of the fragment (block 340) to give other fragments some time to arrive. If the other fragments arrive within a certain (e.g., predefined) period of time (YES branch of block 350), then the received fragment (and all other fragments of the associated data unit) may be transmitted (block 330). However, if the other fragments do not arrive within a certain period of time (NO branch of block 350), the filtering engine 220 may drop the fragment (block 360), as well as other fragments of the associated data unit.

In order to implement the method 300 discussed in reference to FIG. 3, the filtering engine 220 may determine various attributes of the data unit associated with the fragment received in block 310. For example, in order to determine the percentage of fragments of that data unit that have been received, the filtering engine 220 may need to determine the total number of fragments that make up the data unit in question. Such information may be determined from the information in the header of the received fragment. For example, as discussed above, the header may include information about the total length (e.g., in bytes) of the data unit, the length of the header of the data unit, the MTU, the offset of the fragment, and so on. Thus, in one embodiment, the total number of fragments that make up the data unit associated with the received fragment may be calculated as the total length of the data unit (e.g., in bytes) divided by the difference of the MTU and the length of the header of the data unit.

Figure 4:
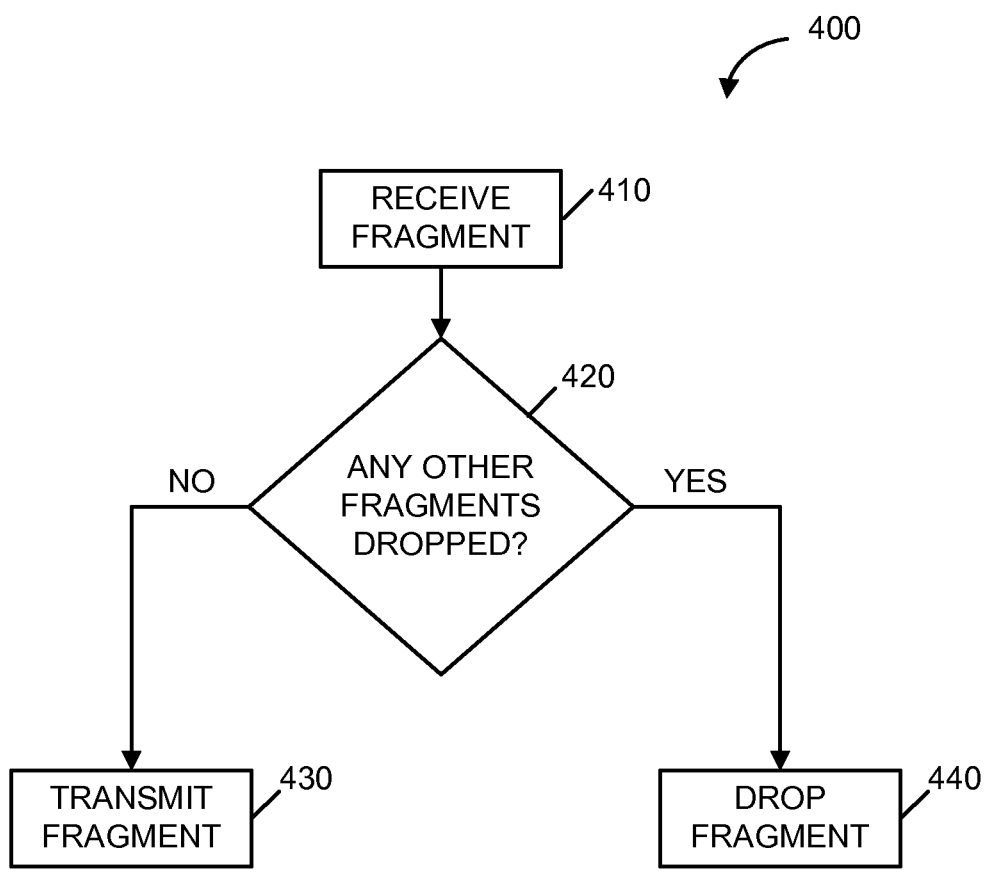
FIG. 4 is a flow diagram of another example method of filtering superfluous data fragments.

FIG. 4 is a flow diagram illustrating another example method 400 the filtering engine 200 may use to filter superfluous data fragments. For ease of explanation, FIG. 4 will be described with reference to FIGS. 1-2. It will be understood, however, that the method 400 may be utilized with systems and devices other than those illustrated in FIGS. 1-2.

Generally speaking, a filtering engine 220 operating in accordance with the method 400 in FIG. 4 may keep track (e.g., in memory 210) of the fragments that the network node 200 drops and filter incoming fragments that are associated with the same data units. More specifically, when the filtering engine 220 receives a fragment of a particular data unit (block 410), the filtering engine 220 may determine whether any other fragments of that data unit have been dropped by the network node 200 (block 420) and only transmit the received fragment (block 430) if no other data fragment of the data unit has been dropped (NO branch of block 420). Otherwise, if at least one data fragment of the data unit has been dropped, the filtering engine 220 may drop the received fragment (block 440).

Figure 5:
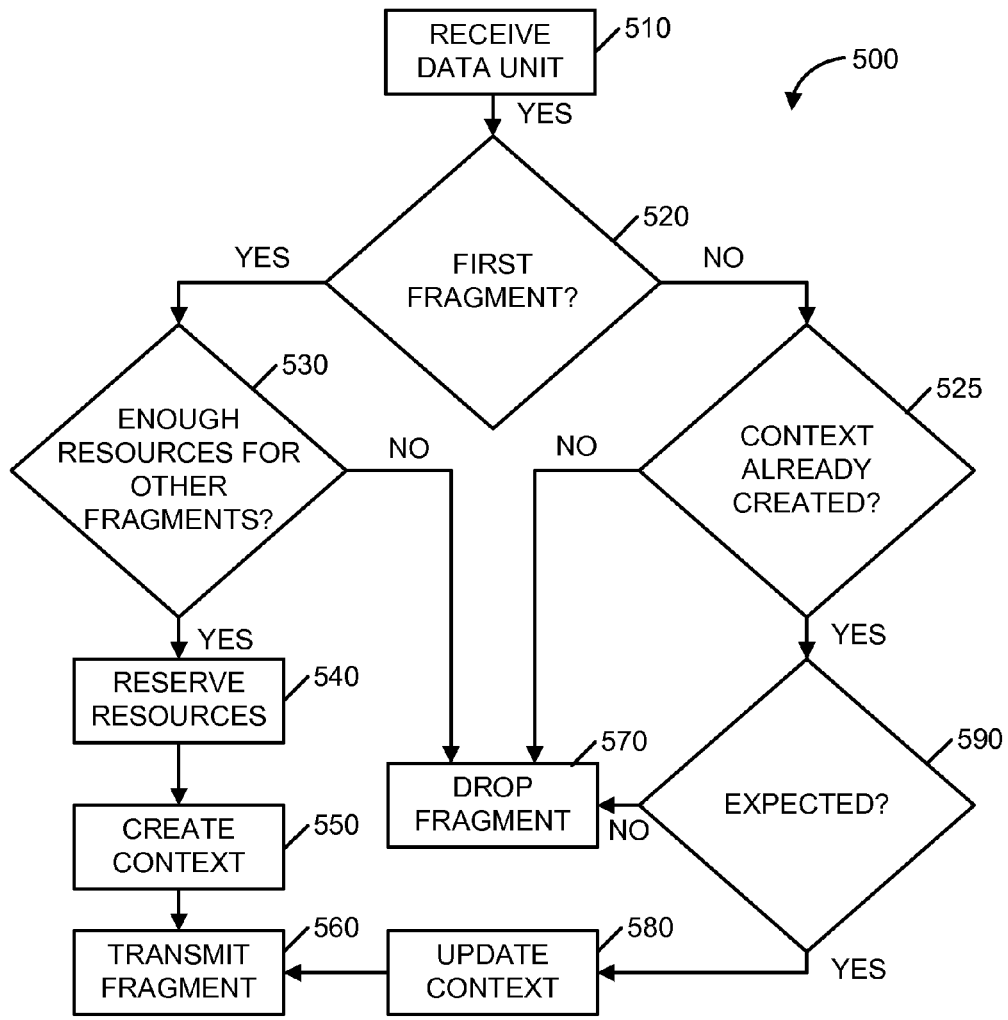
FIG. 5 is a flow diagram of yet another example method of filtering superfluous data fragments.

FIG. 5 is a flow diagram illustrating another example method 500 the filtering engine 220 may use to filter superfluous data fragments. For ease of explanation, FIG. 5 will be described with reference to FIGS. 1-2. It will be understood, however, that the method 500 may be utilized with systems and devices other than those illustrated in FIGS. 1-2.

Generally speaking, a filtering engine 220 operating in accordance with the method 500 in FIG. 5 may monitor the resources of the associated network node 200 and process and transmit a received fragment of a data unit only if the network node 200 has the resources to process and transmit other fragments of the same data unit. More specifically, when the filtering engine 220 receives a fragment of a data unit (block 510), the filtering engine 220 may first determine whether the received fragment is the first fragment of the data unit (block 520). This can be determined by looking at the information in the header of the received fragment. For instance, this can be determined by looking at the offset value discussed above.

If the received fragment is the first fragment of the data unit (YES branch of block 520), the filtering engine 220 may refrain from processing and transmitting the received fragment unless the network node 110 has enough resources to process and transmit other fragments of the data unit. Therefore, the filtering engine 220 may first check whether the network node 200 has the resources to process and transmit other fragments of the data unit (block 530). If so (YES branch of block 530), the filtering engine 220 may ultimately transmit the received fragment (block 560). Otherwise (NO branch of block 530), the filtering engine 220 may drop the received fragment (block 570).

In some embodiments, checking whether the network node 200 has the resources to process and transmit other fragments of the data unit (block 530) may include checking whether the network node 200 has the resources to process and transmit all the fragments of the data unit. However, in some embodiments checking whether the network node 200 has the resources to process and transmit other fragments of the data unit (block 530) may include checking whether the network node 200 has the resources to process and transmit a portion of the fragments of the data unit (e.g., a predefined percentage). For example, if the network node 200, under optimal conditions, has the resources to process and transmit all fragments of the data unit but only currently has the resources, for example, to process and transmit 90% of the fragments, the filtering engine 220 may nonetheless transmit the received fragment based on past performance history indicating that sufficient resources will likely become available before the network node 200 starts dropping fragments.

In some embodiments, checking whether the network node 200 has the resources to process and transmit other fragments of the data unit (block 530) may include checking whether the network node 200 has enough storage capacity (e.g., in memory 210) to temporarily store the other fragments of the data unit as the fragments are being transferred from an ingress interface 230 to an egress interface 240. Accordingly, the filtering engine 220 may, for example, attempt to allocate memory for storing all the fragments of the data unit. If the filtering engine 220 is able to allocate that memory, the filtering engine 220 may determine that the network node 200 has sufficient resources to process and transmit all the fragments of the data unit (YES branch of block 530). Otherwise, the filtering engine 220 may determine that the network node 200 does not have sufficient resources to process and transmit all fragments of the data unit (NO branch of block 530), and the filtering engine 220 may drop the received fragment (block 570).

If the filtering engine 220 determines that the network node 200 has the resources to process and transmit all the fragments of the data unit (YES branch of block 530), the filtering engine 220 may perform further operations in addition to transmitting the fragment (block 560). The filtering engine 220 may actually reserve the necessary resources (e.g., allocate memory) for the other fragments (block 540). The filtering engine 220 may further create a fragmentation context data structure for the data unit that generally includes fragmentation information about the data unit. Fragmentation information about the data unit may include one or more of: the number of fragments, the number of received and/or transmitted fragments, the size of fragments, the next expected fragment, and so on. Accordingly, the fragmentation context data structure may be useful to determine the status of a given data unit when the filtering engine 220 receives a new fragment for that data unit that is not the first fragment of that data unit.

More specifically, when the filtering engine 220 receives a new fragment of a data unit (block 510), and the filtering engine 220 determines (e.g., from the offset value in the header of the fragment) that the received fragment is not the first fragment of the data unit (NO branch of block 520), the filtering engine 220 may check if a fragmentation context data structure exists for that data unit (block 525). If a fragmentation context data structure does not exist (NO branch of block 525), the filtering engine 220 may interpret it as an indication that resources (e.g., space in memory) were not reserved previously for the fragments of the data unit, and that some of the fragments of the data unit might have been consequently dropped. As a result, the filtering engine 220 may drop the received fragment (block 570).

On the other hand, if a fragmentation context data structure does exist for the data unit associated with the received fragment (YES branch of block 525), the filtering engine 220 may interpret it as an indication that resources (e.g., space in memory) were reserved previously for the fragments of the data unit. As a result, the filtering engine 220 may ultimately transmit the received fragment (block 560).

In some embodiments, the filtering engine 220 may transmit the received fragment (block 560) only after performing further operations and/or after additional conditions have been met. In particular, the filtering engine 220 may check if the received fragment is the fragment that was expected (block 590). For example, if fragment N was the last received fragment, then fragment N+1 may be expected next. As explained above, the fragmentation context data structure may include information about which fragment is expected next, so the filtering engine 220 may use the fragmentation context data structure to determine whether the received fragment is, in fact, the fragment that was expected.

If the received fragment was expected (YES branch of block 590), then the filtering engine 220 may transmit the fragment (block 560) and update the fragmentation context data structure with information about a new expected fragment (e.g., N+2) and, potentially, other information (block 580). On the other hand, if the received fragment was not expected (NO branch of block 590), the filtering engine 220 may interpret the arrival of an unexpected fragment as an indication that the expected fragment was lost. As a result, the filtering engine 220 may drop the received fragment (block 570).

Although fragment-filtering techniques were described above with reference to the network node 200, these techniques may be utilized in other types of network devices such network nodes different than the network node 200, routers, network bridges, wireless access points, etc. Moreover, while the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method of controlling transmission of data units, the method comprising:

receiving a first fragment of a data unit at a network node, the data unit having been fragmented into a plurality of fragments, including the first fragment, prior to the first fragment being received at the network node;

determining whether one or more fragments in the plurality of fragments of the data unit have been dropped by one or more other network nodes based on determining whether other fragments of the data unit have been received at the network node within a time period; and only if the other fragments of the data unit have been received within the time period, transmitting the first fragment of the data unit via a network link.

2. The method of claim 1, further comprising:

if the other fragments of the data unit have not been received prior to expiration of the time period, dropping the first fragment of the data unit.

3. The method of claim 1, wherein transmitting the first fragment of the data unit via the network link only if the other fragments of the data unit have been received within the time period comprises:

transmitting the first fragment of the data unit only if a predetermined percentage of all fragments of the data unit have been received within the time period.

4. The method of claim 3, wherein the predetermined percentage of all fragments of the data unit is 90%.

5. The method of claim 3, wherein the predetermined percentage of all fragments of the data unit is 100%.

6. A method of controlling transmission of data units in a network node to a target device, the method comprising:

receiving one fragment of a data unit at a network node, wherein the data unit has been previously fragmented into an ordered sequence of fragments, including the one fragment, prior to the one fragment being received at the network node;

determining whether a predefined percentage of all fragments in the ordered sequence of fragments have been received as of the time when the one fragment is received;

when it is determined that the predefined percentage of all fragments in the ordered sequence of fragments have been received as of the time when the one fragment is received, transmitting the one fragment via a network link; and when it is determined that the predefined percentage of all fragments in the ordered sequence of fragments has not been received as of the time when the one fragment is received, (i) storing the one fragment in a memory for possible future transmission via the network link, or (ii) dropping the one fragment.

7. The method of claim 6, further comprising:

storing in the memory other fragments in the ordered sequence of fragments that were received prior to receiving the one fragment;

when it is determined that the predefined percentage of all fragments in the ordered sequence of fragments have been received as of the time when the one fragment is received, transmitting the other fragments via the network link.

8. The method of claim 7, further comprising:

determining whether the predefined percentage of all fragments in the ordered sequence of fragments have been received within a predefined period of time;

when it is determined that the predefined percentage of all fragments in the ordered sequence of fragments have not been received within the predefined period of time, dropping the one fragment and the other fragments; and when it is determined that the predefined percentage of all fragments in the ordered sequence of fragments have been received within the predefined period of time, transmitting the one fragment and the other fragments via the network link.

9. The method of claim 6, wherein:

determining whether the predefined percentage of all fragments in the ordered sequence of fragments have been received as of the time when the one fragment is received comprises determining whether the predefined percentage of all fragments in the ordered sequence of fragments have been received within a predefined period of time; and the method further comprises when it is determined that the predefined percentage of all fragments in the ordered sequence of fragments have not been received within the predefined period of time, dropping the one fragment.

10. The method of claim 6, wherein the predefined percentage of all fragments in the ordered sequence of fragments is 90%.

11. The method of claim 6, wherein the predefined percentage of all fragments in the ordered sequence of fragments is 100%.

12. An apparatus comprising:

a memory;

at least one ingress interface, coupled to at least a first network link, to receive data units via the at least the first network link;

at least one egress interface, coupled to at least a second network link, to transmit data units via the at least one second network link; and a forwarding engine to forward data units received via the at least one ingress interface to the at least one egress interface, the forwarding engine including a fragment filtering engine configured to:

determine, in response to receiving one fragment of a data unit that was previously fragmented into an ordered sequence of fragments, whether a predefined percentage of all fragments in the ordered sequence of fragments have been received as of the time when the one fragment is received, when it is determined that the predefined percentage of all fragments in the ordered sequence of fragments have been received as of the time when the one fragment is received, transmit the one fragment via one of the network links in the at least one second network link, and when it is determined that the predefined percentage of all fragments in the ordered sequence of fragments has not been received as of the time when the one fragment is received, (i) store the one fragment in the memory for possible future transmission via the one second network link, or (ii) drop the one fragment.

13. The apparatus of claim 12, wherein the fragment filtering engine is configured to:

store in the memory other fragments in the ordered sequence of fragments that were received prior to receiving the one fragment; and when it is determined that the predefined percentage of all fragments in the ordered sequence of fragments have been received as of the time when the one fragment is received, transmit the other fragments via the one second network link.

14. The apparatus of claim 13, wherein the fragment filtering engine is configured to:

determine whether the predefined percentage of all fragments in the ordered sequence of fragments have been received within a predefined period of time;

when it is determined that the predefined percentage of all fragments in the ordered sequence of fragments have not been received within the predefined period of time, drop the one fragment and the other fragments; and when it is determined that the predefined percentage of all fragments in the ordered sequence of fragments have been received within the predefined period of time, transmit the one fragment and the other fragments via the one second network link.

15. The apparatus of claim 12, wherein the fragment filtering engine is configured to:

determine whether the predefined percentage of all fragments in the ordered sequence of fragments have been received within a predefined period of time; and when it is determined that the predefined percentage of all fragments in the ordered sequence of fragments have not been received within the predefined period of time, drop the one fragment.

16. The apparatus of claim 12, wherein the predefined percentage of all fragments in the ordered sequence of fragments is 90%.

17. The apparatus of claim 12 wherein the predefined percentage of all fragments in the ordered sequence of fragments is 100%.

* * * * *